US009503801B2

United States Patent
Nagami

(10) Patent No.: US 9,503,801 B2
(45) Date of Patent: Nov. 22, 2016

(54) PANEL DEVICE

(75) Inventor: Tetsuro Nagami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/402,905

(22) PCT Filed: Aug. 15, 2012

(86) PCT No.: PCT/JP2012/070743
§ 371 (c)(1),
(2), (4) Date: Nov. 21, 2014

(87) PCT Pub. No.: WO2014/027404
PCT Pub. Date: Feb. 20, 2014

(65) Prior Publication Data
US 2015/0139436 A1 May 21, 2015

(51) Int. Cl.
H04R 1/10 (2006.01)
H04R 25/00 (2006.01)
B60R 11/02 (2006.01)
B60R 11/00 (2006.01)
H04R 27/00 (2006.01)

(52) U.S. Cl.
CPC ............. *H04R 1/10* (2013.01); *B60R 11/0235* (2013.01); *H04R 1/1008* (2013.01); *B60R 2011/0015* (2013.01); *B60R 2011/0082* (2013.01); *B60R 2011/0085* (2013.01); *H04R 27/00* (2013.01); *H04R 2420/07* (2013.01); *H04R 2499/13* (2013.01)

(58) Field of Classification Search
CPC ..... H04R 1/10; H04R 2420/07; H04R 5/023

USPC .......... 381/74, 381, 104, 370; 348/837, 838; 345/7

See application file for complete search history.

(56) References Cited

U.S. PATENT DOCUMENTS

| 9,114,745 B2 * | 8/2015 | Schedivy ............. B60N 2/4876 |
| 2003/0202005 A1 | 10/2003 | Sadahiro | |
| 2006/0109388 A1* | 5/2006 | Sanders .................. B60R 11/02 348/837 |
| 2009/0052713 A1 | 2/2009 | Abe | |
| 2010/0045088 A1 | 2/2010 | Kunou | |
| 2010/0232799 A1 | 9/2010 | Lueck | |

FOREIGN PATENT DOCUMENTS

| DE | 10 2009 012 518 A1 | 9/2010 |
| JP | 6-232818 A | 8/1994 |
| JP | 2003-317455 A | 11/2003 |

(Continued)

OTHER PUBLICATIONS

German Office Action issued Aug. 9, 2016 in corresponding German Application No. 112012006809.2 with an English Translation.

*Primary Examiner* — Thjuan K Addy
(74) *Attorney, Agent, or Firm* — Birch, Stewart, Kolasch & Birch, LLP

(57) ABSTRACT

An audio transmission unit 8 is placed on a surface side of a panel unit 4 where a display 7 is provided, and transmits an audio signal in a direction almost perpendicular to the surface of the display 7. When a viewer sitting in a seat behind a front seat 1 turns the display 7 to be faced toward him/her, the audio transmission unit 8 is directed in front of the viewer's eyes, so that stable audio signal can be received in the side of the headphone worn on the head of the viewer.

5 Claims, 13 Drawing Sheets

(56) References Cited

FOREIGN PATENT DOCUMENTS

| | | |
|---|---|---|
| JP | 2006-15936 A | 1/2006 |
| JP | 2006-88953 A | 4/2006 |
| JP | 2006-238038 A | 9/2006 |
| JP | 2007-336327 A | 12/2007 |
| JP | 2008-279155 A | 12/2007 |

* cited by examiner (a)

(b)

(a)

(b)

(a)

(b)

(a)

(b)

(a)

(b)

PANEL DEVICE

TECHNICAL FIELD

This invention relates to a panel device which is placed on a rear surface of a reclinable seat and in which a panel unit having a display is made open or closed.

BACKGROUND ART

There is known an in-vehicle data-reproduction system which includes, in order that a passenger in a rear seat can enjoy video and music in a vehicle, a display that is placed on a ceiling and faced toward the rear seat, and a headphone for the passenger in the rear seat that receives an audio signal transmitted wirelessly from the display-side to thereby outputs a sound (see, for example, Patent Document 1).

Further, there is also a system in which a display is placed on a rear surface of a front seat in order not to interfere in rearward visibility of a driver. An example of this is shown in FIG. 11 and FIG. 12. As shown in FIG. 11, in a body unit 2 placed on the rear surface of a front seat 1, a panel unit 4 is stored with its display 7 being in a closed state. The panel unit 4 is coupled in openable and closable manner to the body unit 2 by a pair of hinge mechanisms 3, so that a viewer 50 in a rear seat pushes down a panel open switch 5 to release a lock between the panel unit 4 and a latch 6, and manually turns the panel unit 4 until the display 7 reaches an easily viewable angle for him/her as shown in FIG. 12. Further, an audio signal is transmitted by infrared light from an audio transmission unit 8 placed at an edge portion of the body unit 2, and a headphone 10 outputs as a sound, the audio signal of infrared light received by its audio reception unit 9.

In this configuration, since the audio transmission unit 8 is provided at the side of the body unit 2 where its design surface is placed, there is a problem that when a head position (that is, a position of the headphone 10) changes between an adult and a child as the viewers 50, it is difficult to surely receive the infrared light because of limitations in directional angle of transmitter elements 11a to 11c in the audio transmission unit 8 and in directional angle of a receiver element (not shown) in the audio reception unit 9. In order to solve that problem, conventionally, such a plurality of transmitter elements 11a to 11c are mounted on a special board 12 at their respective different angles as shown in FIG. 12, to thereby enlarge their transmission range. Thus, the number of the transmitter elements increases, resulting in degraded ease of assembly. In addition, because the front seat 1 is reclinable in many cases, and in that case, it is necessary to mount the transmitter elements 11a to 11c so that they accommodate not only to the difference in the head position of the viewer 50 but also to tilt angles due to reclining.

Here, a correspondence relationship between an adult viewer and directional angles 11a' to 11c' of the transmitter elements 11a to 11c is shown in FIG. 13, and a correspondence relationship between a child viewer 50 and directional angles 11a' to 11c' of the transmitter elements 11a to 11c is shown in FIG. 14. In FIG. 13 and FIG. 14, the transmitter element 11a, 11b and 11c of the audio transmission unit 8 can transmit infrared light within ranges of the directional angle 11a', the directional angle 11b' and the directional angle 11c', respectively.

With respect to the adult viewer 50 whose position of the headphone 10 is high, when the front seat 1 is at a tilt angle as shown in FIG. 13 (a), the audio reception unit 9 mainly receives the audio signal of the transmitter element 11b (directional angle 11b'), whereas when the front seat 1 is tilted rearward by about 20 degrees so as to be at a tilt angle as shown in FIG. 13(b), the audio reception unit 9 mainly receives the audio signal of the transmitter element 11a (directional angle 11a'). On the other hand, as to the child viewer 50 whose position of the headphone 10 is low, when the front seat 1 is at a tilt angle as shown in FIG. 14(a), the audio reception unit 9 mainly receives the audio signals of the transmitter elements 11b, 11c (directional angles 11b', 11c'), whereas when the front seat 1 is tilted rearward by about 20 degrees so as to be at a tilt angle as shown in FIG. 14(b), the audio reception unit 9 mainly receives the audio signal of the transmitter element 11a (directional angle 11a'). Accordingly, if the plurality of transmitter elements 11a to 11c is not mounted at their respective proper angles, there were cases where sufficient audio signal did not reach depending on the position of the headphone 10 and the tilt angle of reclining.

Meanwhile, in FIG. 12, since a recess portion 2a for storing the panel unit 4 is provided on the side of the body unit 2 where its design surface is placed, a circuit board (not shown) of the body unit 2 is provided in the back of the recess portion 2a. At the same time, the audio transmission unit 8 is required to be provided at the side of the body unit 2 where its design is placed. Thus, it is necessary to provide the special board 12 for the audio transmission unit 8 separately from the circuit board of the body unit 2, and to make connection between both of these boards using a lead wire 13 or the like.

On the other hand, in an automotive audiovisual system described in Patent Document 2, an infrared radiator for transmitting an infrared light beam (corresponding to the audio transmission unit 8) is fixed onto a console box placed near the elbow of the driver, or an overhead console provided on the ceiling of the automobile. Thus, there were cases where sufficient audio signal did not reach the headphone worn by the viewer from the infrared radiator because of interference by the seat due to change of the seat when, for example, it was slid or reclined.

CITATION LIST

Patent Document

Patent Document 1: Japanese Patent Application Laid-open No. 2007-336327
Patent Document 2: Japanese Patent Application Laid-open No. 2006-15936

SUMMARY OF THE INVENTION

Problems to be Solved by the Invention

Since the conventional panel devices are configured as described above, there is a problem that stable audio signal is not received by the headphone side depending on the position of the headphone worn by the viewer and the tilt angle of the reclinable seat.

This invention has been made to solve the problem as described above, and an object thereof is to provide a panel device that makes it possible for the headphone side to receive stable audio signal, regardless of the position of the headphone worn by the viewer and the tilt angle of the reclinable seat.

Means for Solving the Problems

A panel device of the invention comprises: a body unit placed on a rear surface of a seat; a hinge mechanism fixed to the body unit; a panel unit which is turnably coupled to the body unit through the hinge mechanism, so as to allow its display surface to be faced behind the seat; an audio transmission unit that is placed on a side of the panel unit where the display surface is placed, and transmits wirelessly an audio signal in a direction almost perpendicular to the display surface; a reception unit that receives a signal related to an audio signal wirelessly transmitted by a transmission unit, from a headphone including an audio reception unit that receives the audio signal wirelessly transmitted by the audio transmission unit, and the transmission unit that wirelessly transmits the signal related to the audio signal received by the audio reception unit; and an output unit that visualizes the signal related to the audio signal received by the reception unit, wherein the panel unit is turnable with visually recognizing the signal visualized by the output unit.

Effect of the Invention

According to the invention, because the audio transmission unit is placed on the side of the panel unit where the display surface is placed, and transmits an audio signal in a direction almost perpendicular to the display surface, even if the seat on which the body unit is provided is reclined, when the viewer riding behind the seat turns the display to be faced toward him/her, the audio transmission unit is always directed in front of the eyes of the viewer, so that stable audio signal can be received in the headphone side.

MODES FOR CARRYING OUT THE INVENTION

Hereinafter, for illustrating the invention in more detail, embodiments for carrying out the invention will be described according to the accompanying drawings.

Embodiment 1

Figure 1:
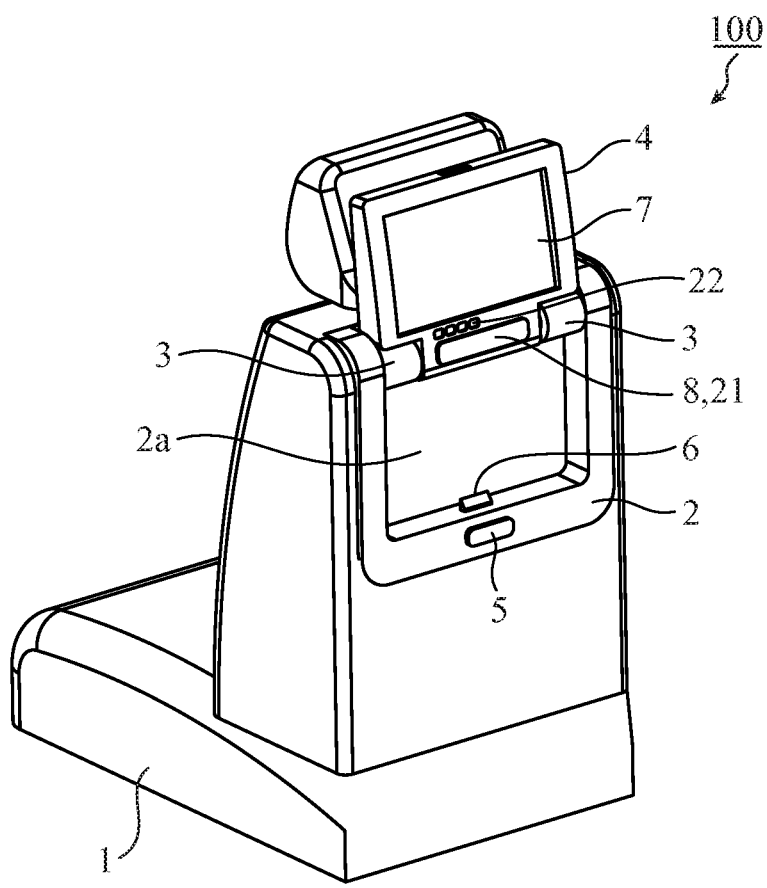
FIG. 1 is a perspective view showing a panel device according to Embodiment 1 of the invention in which a panel unit is unfolded to establish a viewable state.
Figure 2:
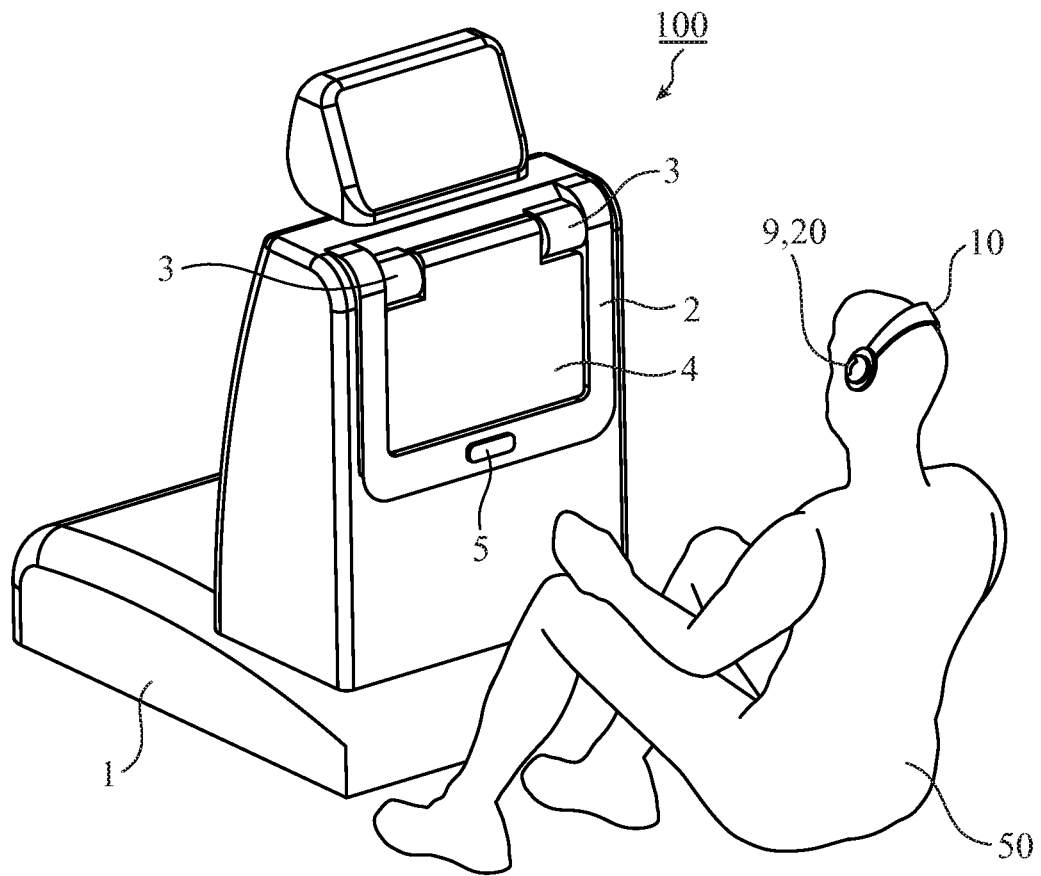
FIG. 2 is a perspective view showing a positional relationship between a front seat on which the panel device according to Embodiment 1 is placed, and a viewer riding in a rear seat.
Figure 3:
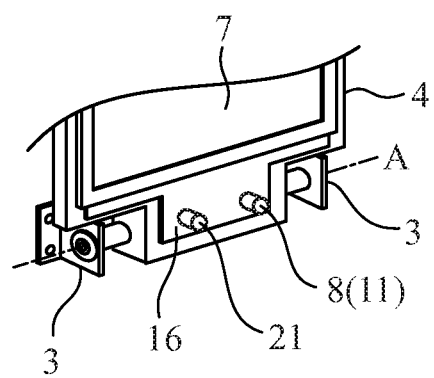
FIG. 3 is a perspective view showing an internal structure of the panel unit of the panel device according to Embodiment 1.
Figure 4:
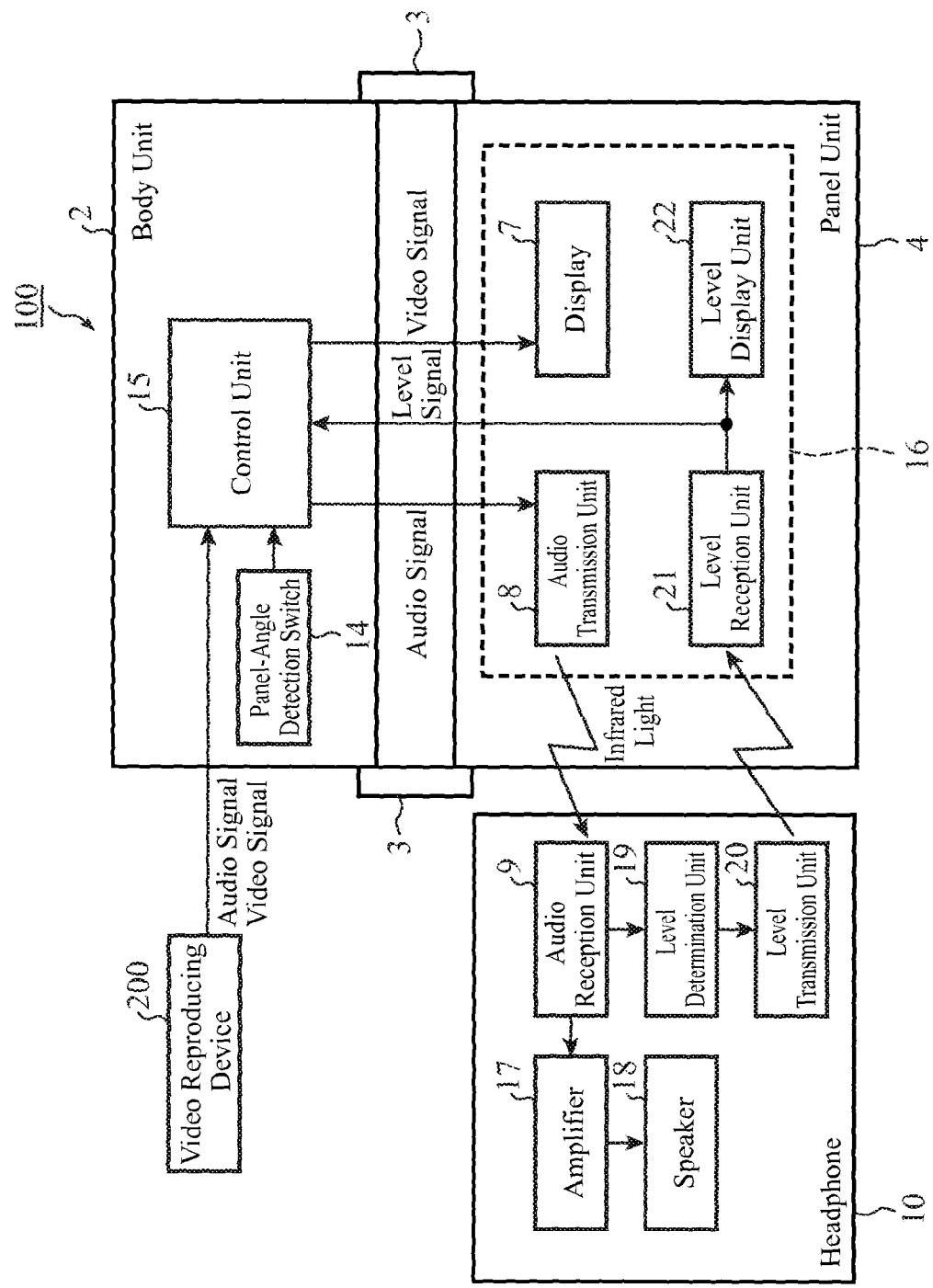
FIG. 4 is a block diagram showing a configuration of the panel device according to Embodiment 1.

FIG. 1 is a perspective view showing a panel device 100 according to Embodiment 1 in which a panel unit 4 is unfolded to establish a viewable state. FIG. 2 is a perspective view showing a positional relationship between a front seat 1 on which the panel device 100 is placed, and a viewer 50 riding in a rear seat. FIG. 3 is a perspective view for illustrating an internal structure of the panel unit 4 by removing a design surface of the panel unit 4. FIG. 4 is a block diagram showing a configuration of the panel device 100. Note that in FIG. 1 to FIG. 4, the same reference numerals are given for the same or equivalent parts in FIG. 11 to FIG. 14 illustrated previously.

The panel device 100 is provided on a rear surface of the reclinable front seat 1, such as a driver's seat or an assistant driver's seat of an automobile, and this panel device 100 is configured with a body unit 2, a pair of hinge mechanisms 3 fixed to an upper end portion of the body unit 2, and a panel unit 4 which is turnably coupled to the body unit 2 through the pair of hinge mechanisms 3 and is brought into a viewable state when it is turned from its stored state in a recess portion 2a of the body unit 2 so as to unfold a display 7. A video is displayed on the display 7 of the panel unit 4, whereas a sound is output from a headphone 10 prepared for the viewer 50 in the rear seat in order not to divert the driver's attention.

The viewer 50, when going to watch a video, pushes down a panel open switch 5 provided at a lower portion of the body unit 2 to release a lock between the panel unit 4 and a latch 6, and manually turns the panel unit 4 to an easily viewable angle for him/her.

When the viewer 50 manually turns the panel unit 4 such that it is turned to a predetermined angle or more, a panel-angle detection switch 14 (shown in FIG. 4) provided on the body unit 2 is pushed by the panel unit 4 to operate so as to give an angle detection notice to a control unit 15. The control unit 15 having received this notice outputs a video signal outputted from a video reproducing device 200 to the display 7, so that the display 7 displays video images. Concurrently, the control unit 15 outputs an audio signal outputted from the video reproducing device 200 to an audio transmission unit 8, so that the audio transmission unit 8 wirelessly transmits the audio signal, after converting it into infrared light, to an audio reception unit 9 of the headphone 10.

As shown in FIG. 3, the audio transmission unit 8 is provided with a transmitter element 11 that is mounted on the surface side of the panel unit 4 where the display 7 is provided, and on a circuit board 16 so as to be placed on and near a pivotal axis line A of the hinge mechanisms 3. The transmitter element 11 converts the audio signal inputted from the control unit 15 of the body unit 2 into infrared light and transmits the infrared light within a predetermined range of directional angle centered on a direction almost perpendicular to the surface of the display 7. This infrared light is received and D/A converted by the audio reception unit 9 provided in the headphone 10, and then outputted through a speaker 18 after amplified by an amplifier 17.

Since the audio transmission unit 8 is provided on the circuit board 16 of the panel unit 4, it becomes unnecessary to prepare a special board for the audio transmission unit 8 as is conventionally done, so that it becomes possible to reduce the number of components to thereby enhance ease of assembly.

Figure 5:
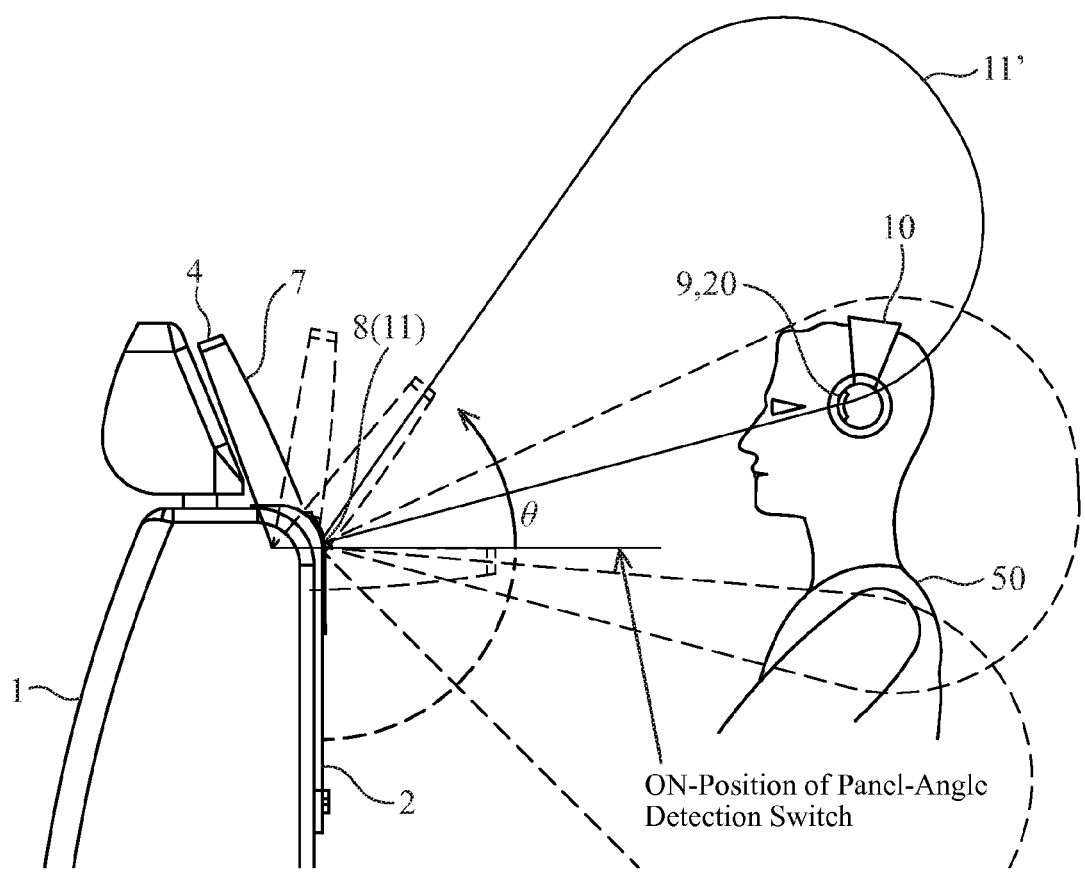
FIG. 5 is a diagram showing a correspondence relationship between a viewer and a directional angle of a transmitter element in the panel device according to Embodiment 1.

Here is shown in FIG. 5 a correspondence relationship between the viewer 50 and a directional angle 11' of the transmitter element 11. When the panel unit 4 is turned from its stored position to an angle θ, so that the panel-angle detection switch 14 (not shown) of the body unit 2 becomes ON-state, an audio signal of infrared light is transmitted from the audio transmission unit 8.

The transmitter element 11 of the audio transmission unit 8 is turned integrally with the panel unit 4 and transmits the audio signal in a direction almost perpendicular to the surface of the display 7, so that the directional angle 11' of the transmitter element 11 is always oriented in a frontward direction of the display 7 and the audio signal is transmitted in the frontward direction of the display 7.

Figure 6:
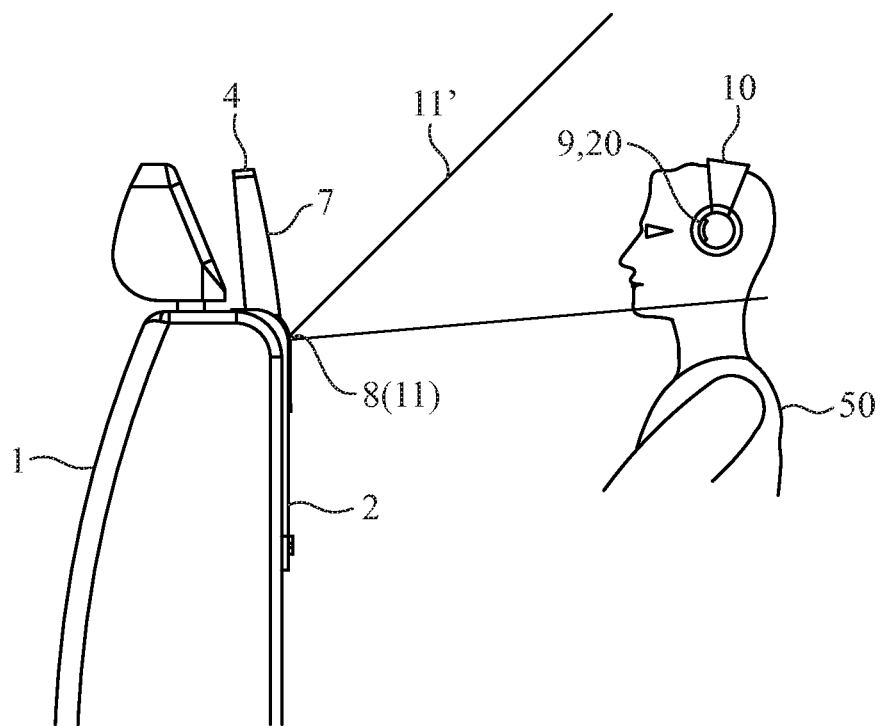
FIG. 6 is a diagram showing a correspondence relationship between an adult viewer and a directional angle of the transmitter element in the panel device according to Embodiment 1.
Figure 6:
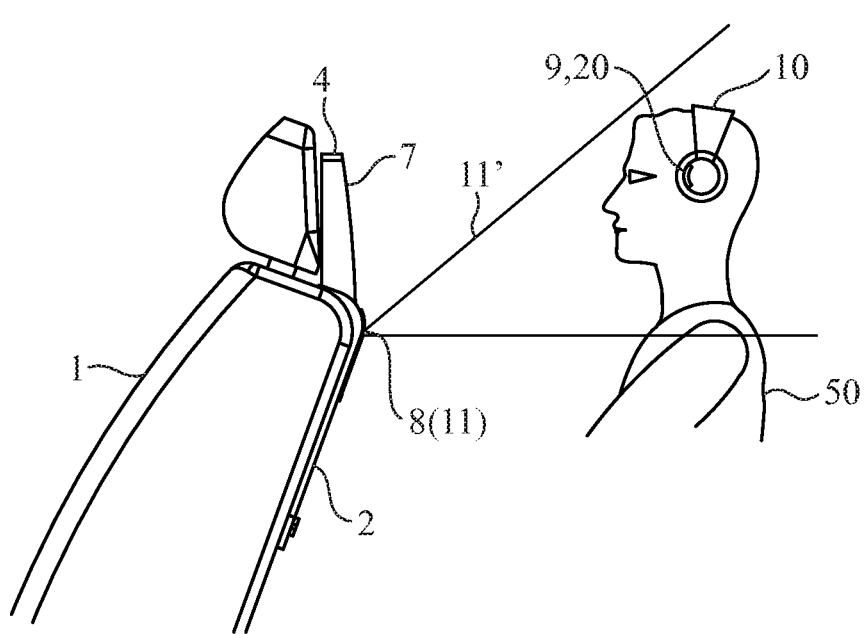
Figure 7:
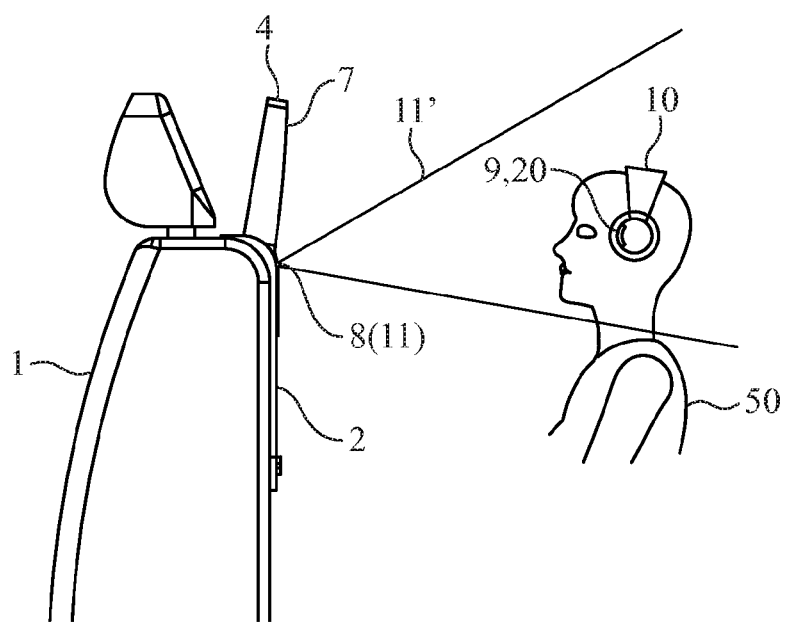
FIG. 7 is a diagram showing a correspondence relationship between a child viewer and a directional angle of the transmitter element in the panel device according to Embodiment 1.
Figure 7:
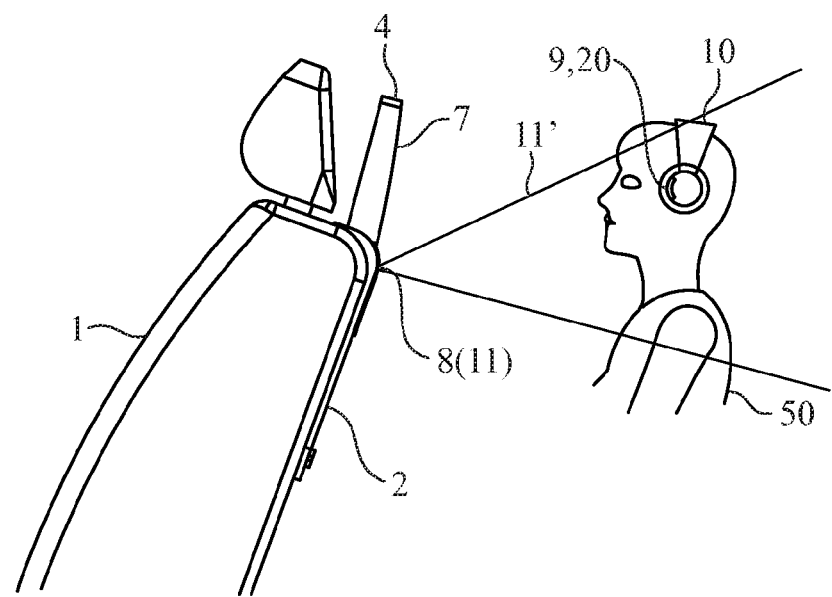

FIG. 6 shows a correspondence relationship between an adult viewer 50 and a directional angle 11' of the transmitter element 11, and FIG. 7 shows a correspondence relationship between a child viewer 50 and a directional angle 11' of the transmitter element 11. In this panel device 100, since the audio signal is transmitted in a frontward direction of the display 7, when the viewer 50 turns the panel unit 4 to an easily viewable angle for him/her to thereby cause the display 7 to be directed in front of his/her eyes, the transmitter element 11 of the audio transmission unit 8 is also turned integrally with the panel unit 4 to be directed in front of the viewer 50, so that the infrared light is transmitted toward the viewer 50. Accordingly, in either case of the adult viewer 50 whose position of the headphone 10 is high as shown in FIG. 6(*a*) or the child viewer 50 whose position of the headphone 10 is low as shown in FIG. 7(*a*), the audio reception unit 9 is positioned within a directional angle 11' of the transmitter element 11, and thus can receive stable audio signal.

Further, even in the case where the front seat 1 is tilted (reclined) rearward as shown in FIG. 6(*b*) and FIG. 7(*b*), because the viewer 50 manually turns again the panel unit 4 to a video easily-viewable angle to thereby cause the display 7 to be directed in front of his/her eyes, the infrared light is transmitted toward the face of the viewer 50. Thus, the audio reception unit 9 can receive stable audio signal.

As described above, in Embodiment 1, since the audio transmission unit 8 is arranged on a surface of the panel unit 4 where the display 7 is provided, it is unnecessary to place a plurality of transmitter elements 11 at different angles as is conventionally done, so that it is possible to enhance ease of assembly.

Further, even in the case of shaking due to resonance of the panel unit 4 that occurs upon receiving vibration of a vehicle or the like, a portion on and near the pivotal axis line A is less affected by the resonance. Therefore, by placing the audio transmission unit 8 on and near the pivotal axis line A, it is possible to decrease deviation in the directional angle 11' of the transmitter element 11. Thus, the audio reception unit 9 can receive stable audio signal.

Next, description will be made how the viewer 50 adjusts the position of the display 7 to a proper angle in order to receive stable audio signal.

In the panel device 100 according to Embodiment 1, there are provided in the headphone 10, a level determination unit 19 that determines a strength/weakness of reception level of the audio signal, and a level transmission unit 20 that transmits the level determined by the level determination unit 19 to the panel unit 4 as a level signal. In the other side, i.e. the panel unit 4, there are provided a level reception unit 21 that receives the level signal transmitted by the level transmission unit 20 of the headphone 10, and a level output unit 22 that notifies the viewer 50 of the level signal received by the level reception unit 21. Communication between the level transmission unit 20 and the level reception unit 21 is performed using any type of wireless method.

Figure 8:
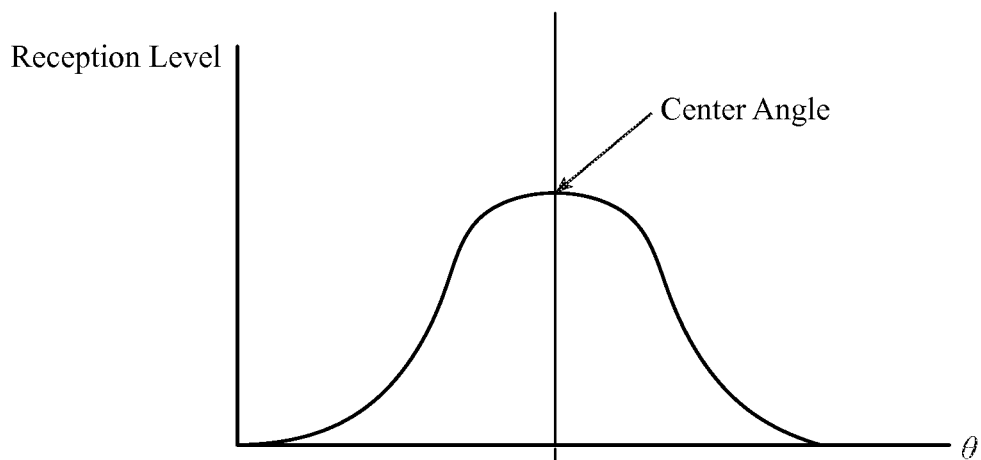
FIG. 8 is graphs showing a relationship between an angle of the panel unit and a reception level of an audio signal in the panel device according to Embodiment 1.
Figure 8:
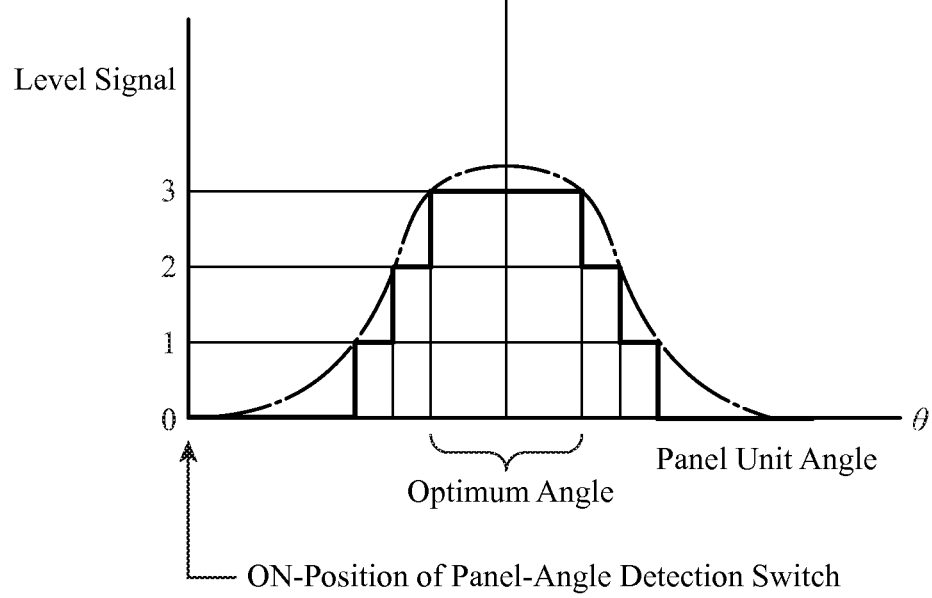

In an example in FIG. 8, a correspondence relationship between a strength/weakness of the reception level of the audio signal and a level signal (for example, among four ranks of levels 0 to 3) is preset in the level determination unit 19. Note that, in the example in FIG. 1, four LEDs (Light Emitting Diodes) are used as the level output unit 22.

FIG. 8(*a*) is a graph showing a relationship between an angle of the panel unit 4 and a reception level of the audio signal received by the audio reception unit 9, in which the ordinate represents the reception level and the abscissa represents the angle of the panel unit 4 with reference to a position where the panel-angle detection switch 14 becomes ON-state. FIG. 8(*b*) is a graph showing a relationship between an angle of the panel unit 4 and a level signal determined by the level determination unit 19, in which the ordinate represents the level signal determined for each reception level from among four ranks of 0 to 3, and the abscissa represents the angle of the panel unit 4 with reference to the position where the panel-angle detection switch 14 becomes ON-state.

When the viewer 50 turns the panel unit 4, the directional angle 11' of the transmitter element 11 moves integrally with turning of the panel unit 4 as shown in FIG. 5, so that the reception level becomes a maximum intensity at the time the display 7 comes at an angle θ at which it is directed in front of the eyes of the viewer 50. The angle θ at that time is referred to as a center angle (FIG. 8). Thus, in the level determination unit 19, a high level is determined when the audio reception unit 9 is within the directional angle 11' of the transmitter element 11 that is turned integrally with the panel unit 4, and a low level is determined when the audio reception unit is out of the directional angle 11'. In the case where the strength/weakness of the reception level is determined from among four ranks of levels 0 to 3, level 3 represents that the reception level is highest, so that an audio signal is stably received. In contrast, level 0 represents that the reception level is lowest, so that an audio signal is not stably received, that is, the angle of the panel unit 4 is not proper relative to the headphone 10.

In the headphone 10, the level determination unit 19 determines from among the four ranks, a strength/weakness of the reception level of the audio signal received by the audio reception unit 9, and outputs the level to the level transmission unit 20 as a level signal. The level transmission unit 20 transmits the level signal to the level reception unit 21 of the panel unit 4.

In the panel unit 4, the level reception unit 21 receives the level signal. The level output unit 22 lights all of four LEDs when the level signal received by the level reception unit 21 is at level 3, and lights only one of the LEDs when the signal is at level 0. In such a manner, when the audio signal is in good reception condition at the headphone 10, a lighting amount of the level output unit 22 is made larger, and when it is in poor reception condition, the lighting amount of the level output unit 22 is made smaller, thus allowing the viewer 50 to visually determine whether the angle of the panel unit 4 is proper or not. This makes it possible for the viewer 50 to adjust the panel unit 4 to a proper angle.

Note that in the example in FIG. 1, although a plurality of LEDs is used as the level output unit 22 so as to change the lighting amount for each level, this is not limitative. For example, the level output unit 22 may be configured by using a single indication lamp such that a lighting color of the indication lamp changes from red to blue when the angle becomes proper.

Figure 9:
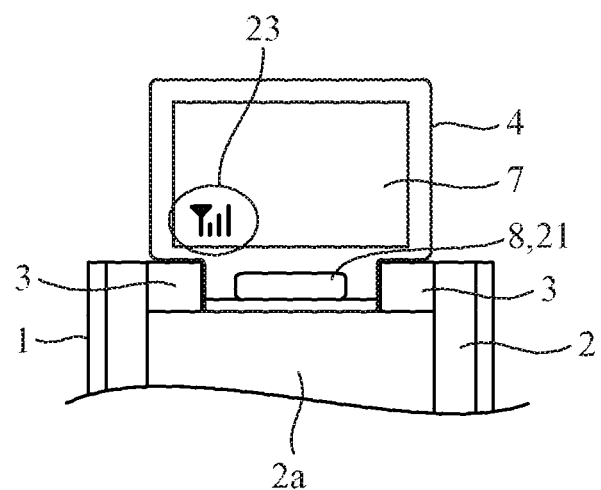
FIG. 9 is a diagram showing a display example of an antenna mark indicative of a reception level.

Instead, it may be configured, for example, to display the reception level on the display 7. In this configuration, the level signal is outputted from the level reception unit 21 to the control unit 15 of the panel unit 4, and then the control unit 15 causes the display 7 of the panel unit 4 to display a mark by which each level is recognizable. An antenna mark 23 shown in FIG. 9 or the like is conceivable as the mark by which each level is recognizable.

Consequently, according to Embodiment 1, the panel device 100 is configured to include: the body unit 2 placed on the rear surface of the reclinable front seat 1; the hinge mechanisms 3 fixed to the body unit 2; the panel unit 4 which is turnably coupled to the body unit 2 through the hinge mechanisms 3 to be turned from its stored state in the body unit 2-side with the surface of the display 7 being faced to that side, so as to unfold the display 7; and the audio transmission unit 8 that is placed on the surface side of the panel unit 4 where the display 7 is provided, and transmits wirelessly the audio signal in a direction almost perpendicular to the surface of the display 7. Thus, even if the front seat 1 on which the body unit 2 is provided is reclined, when the viewer 50 riding behind the front seat 1 turns the display 7 to be faced toward him/her, the audio transmission unit 8 is always directed in front of the eyes of the viewer 50, so that stable audio signal can be received in the headphone 10-side.

Further, according to Embodiment 1, the audio transmission unit 8 is configured to be placed on the surface side of the panel unit 4 where the display 7 is provided, as well as on and near the pivotal axis line A of the hinge mechanisms 3. Thus, even if the panel unit 4 is shaken due to vibration of the front seat 1, the transmission direction of the audio transmission unit 8 is less affected by the vibration. Thus, stable audio signal can be received in the headphone 10-side.

Further, according to Embodiment 1, the circuit board of the audio transmission unit 8 is unified with the circuit board 16 of the panel unit 4. Thus, it is possible to reduce the number of components to thereby enhance ease of assembly.

With respect to the configuration described above, the headphone 10 is not necessarily required in the panel device 100.

Further, according to Embodiment 1, the panel device 100 is configured to comprise the headphone 10; wherein the headphone 10 includes the audio reception unit 9 that receives the audio signal wirelessly transmitted by the audio transmission unit 8, the level determination unit 19 that determines the reception level of the audio signal received by the audio reception unit 9, and the level transmission unit 20 that wirelessly transmits the reception level determined by the level determination unit 19; and wherein the panel unit 4 includes the level reception unit 21 that receives the reception level wirelessly transmitted by the level transmission unit 20 and the level output unit 22 that visualizes the reception level received by the level reception unit 21. Thus, when the panel unit 4 is not at a proper angle and thus the reception level of the audio signal is weak at the headphone 10, the viewer 50 can recognize visually by the level output unit 22 that the panel unit 4 is not at a proper angle. Accordingly, the viewer 50 can adjust the position of the display 7 by turning the panel unit 4 to a proper angle. As a result, stable audio signal can be received in the headphone 10-side.

Note that in the above description, such a configuration is exemplified in which the reception level of the audio signal is wirelessly transmitted/received between the headphone 10 and the panel unit 4; however, it may be a configuration in which a signal related to the audio signal, not limited to the level signal, is transmitted/received therebetween.

Embodiment 2

In Embodiment 1, such a configuration is employed that causes the viewer 50 to manually turn the panel unit 4 to be adjusted to a proper angle, whereas in Embodiment 2, such a configuration is employed in which the panel device 100 automatically adjusts the panel unit 4 to its proper angle.

Figure 10:
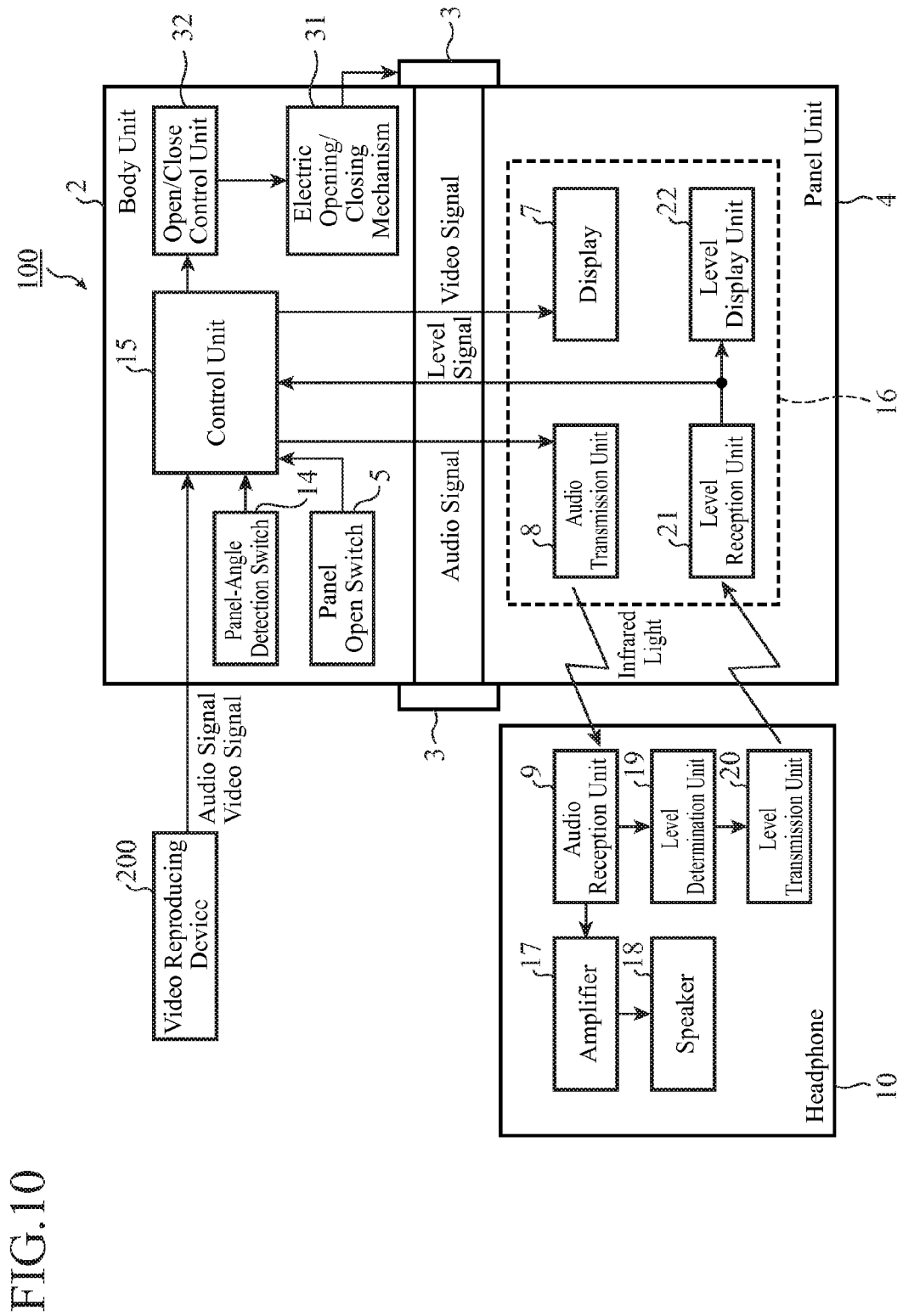
FIG. 10 is a block diagram showing a configuration of a panel device according to Embodiment 2.
Figure 11:
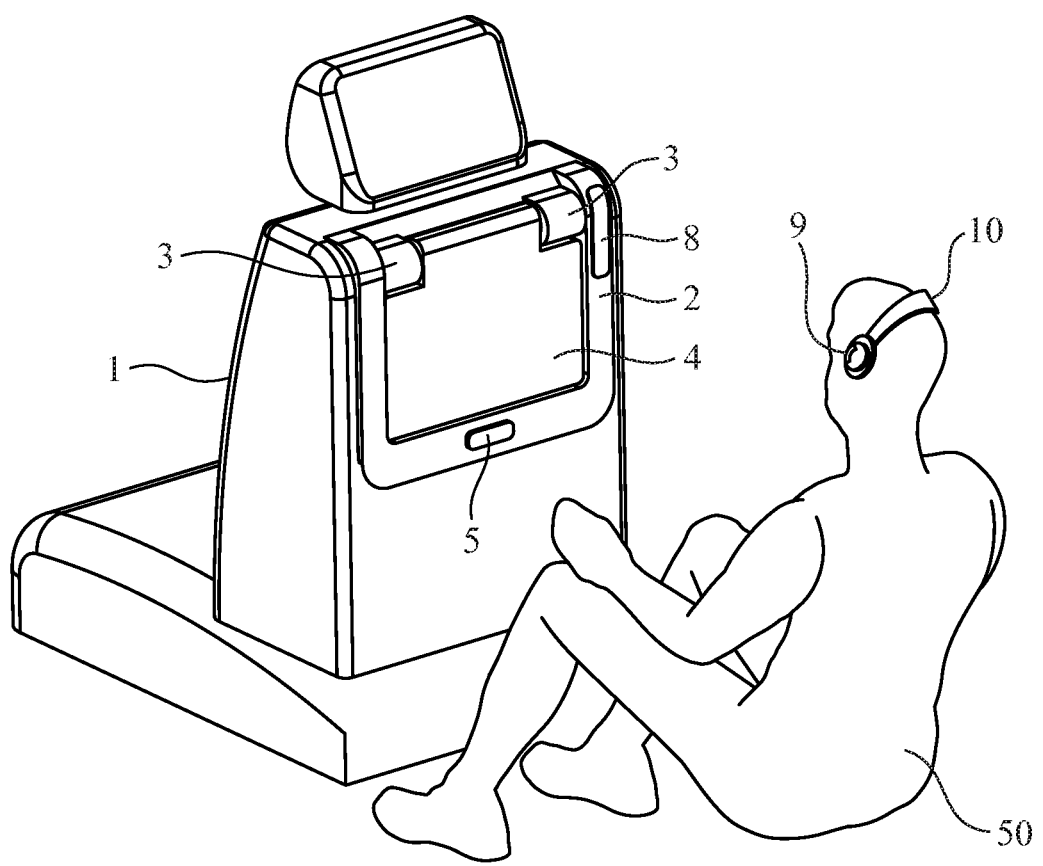
FIG. 11 is a perspective view showing a positional relationship between a front seat on which a conventional in-vehicle data-reproduction system is placed, and a viewer riding in a rear seat.
Figure 12:
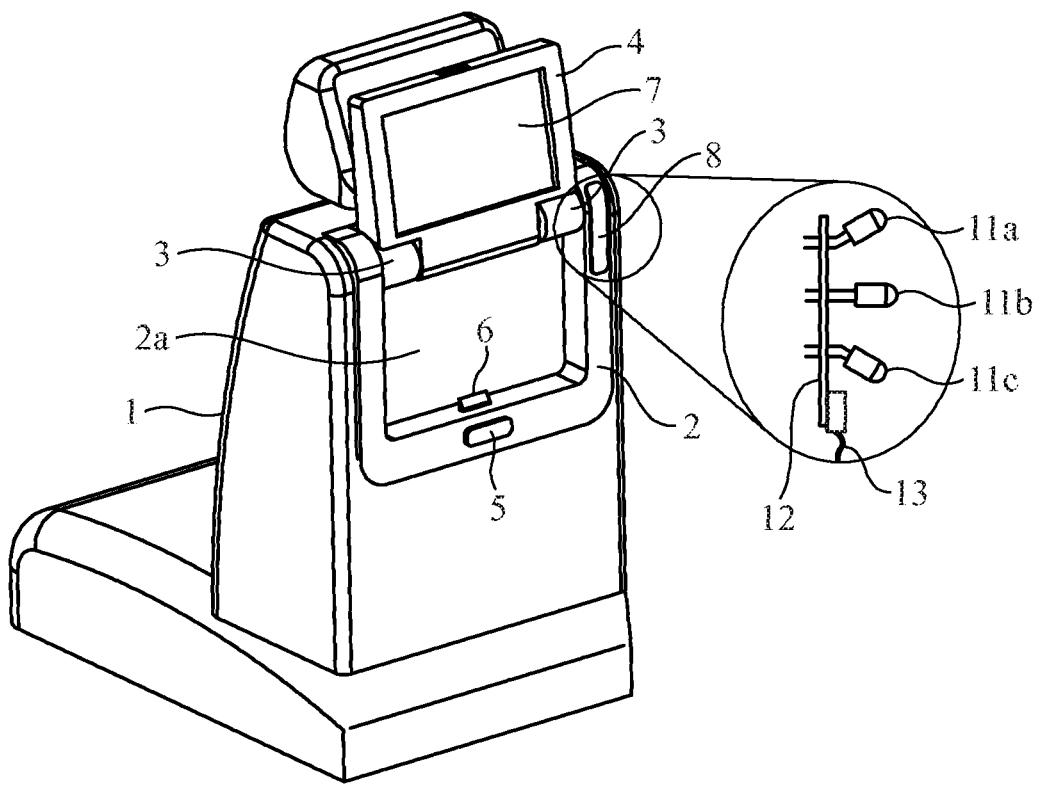
FIG. 12 is a perspective view of the conventional in-vehicle data-reproduction system shown in FIG. 11, in which a panel unit is unfolded to establish a viewable state.
Figure 13:
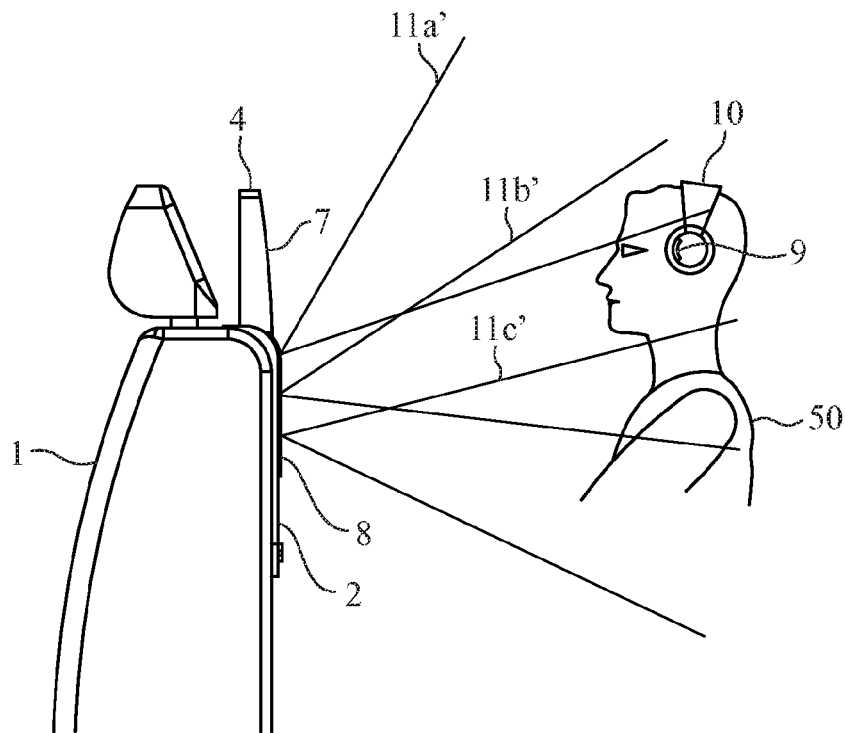
FIG. 13 is a diagram showing a correspondence relationship between an adult viewer and directional angles of transmitter elements in the conventional in-vehicle data-reproduction system shown in FIG. 11.
Figure 13:
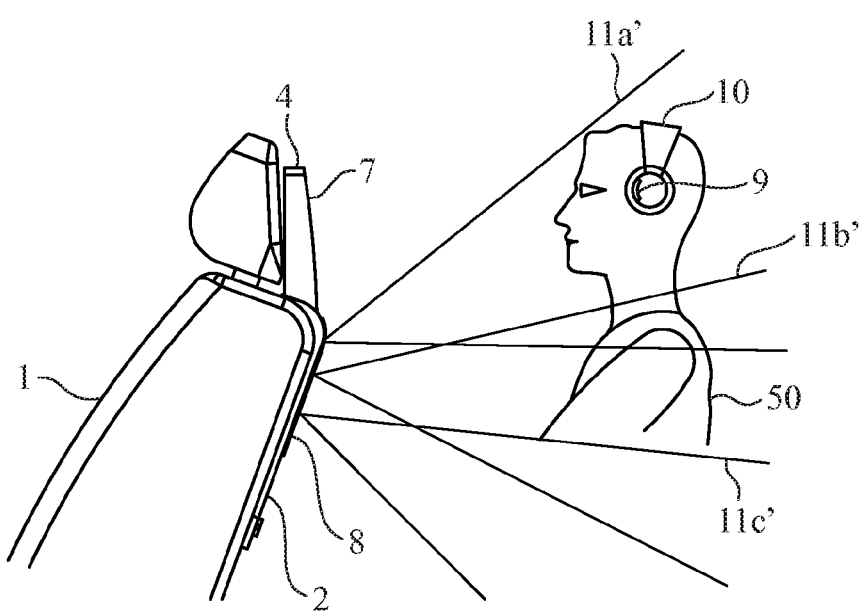
Figure 14:
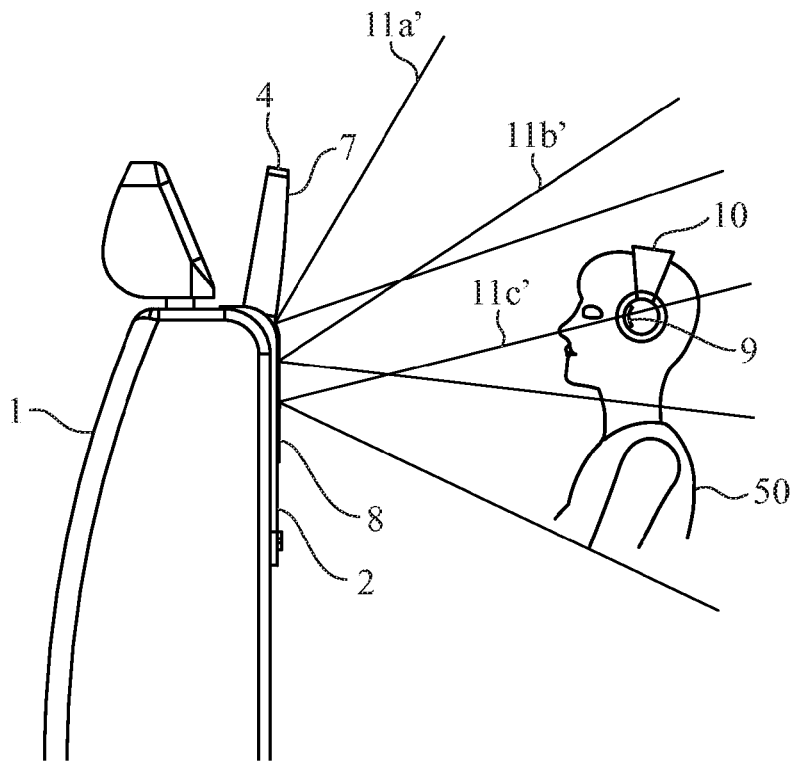
FIG. 14 is a diagram showing a correspondence relationship between a child viewer and directional angles of the transmitter elements in the conventional in-vehicle data-reproduction system shown in FIG. 11.
Figure 14:
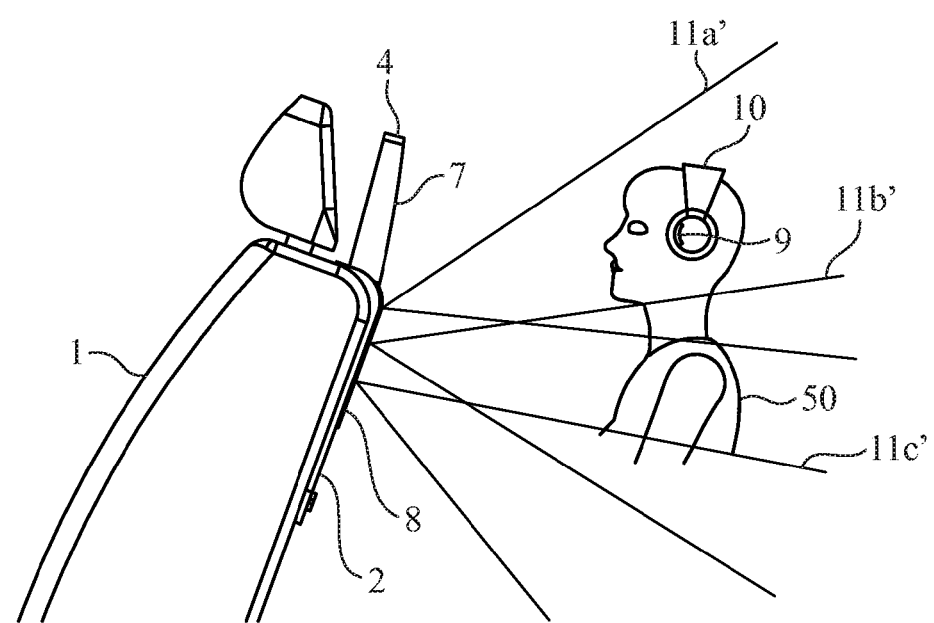

FIG. 10 is a block diagram showing a configuration of a panel device 100 according to Embodiment 2 of the invention. Note that in FIG. 10, the same reference numerals are given for the same or equivalent parts in FIG. 4, so that description therefor is omitted here. Further, the outward appearance of the panel device 100 according to Embodiment 2 is similar to that of the panel device 100 shown in FIG. 1 and FIG. 2, so that it is omitted from illustration.

The panel device 100 according to Embodiment 2 includes an electric opening/closing mechanism 31 that electrically opens/closes the panel unit 4, and an open/close control unit 32 that controls the electric opening/closing mechanism 31. Further, the control unit 15 of the body unit 2 accepts to receive the level signal from the level reception unit 21 of the panel unit 4, determines the angle of the panel unit 4 on the basis of that level signal, and outputs a command to the open/close control unit 32.

When the viewer 50 going to watch a video, the viewer 50 pushes down the panel open switch 5 provided at a lower portion of the body unit 2. The control unit 15 detects that the panel open switch 5 has been pushed down and outputs a command to the open/close control unit 32, so that the open/close control unit 32 drives the electric opening/closing mechanism 31 to thereby turn the panel unit 4 in its opening direction.

When the electric opening/closing mechanism 31 electrically turns the panel unit 4 so that it is turned to a predetermined angle or more, the panel-angle detection switch 14 provided on the body unit 2 is pushed by the panel unit 4 to operate so as to give an angle detection notice to the control unit 15. The control unit 15 having received this notice outputs a video signal outputted from the video reproducing device 200 to the display 7, so that the display 7 displays video images. Concurrently, the control unit 15 outputs an audio signal outputted from the video reproducing device 200 to the audio transmission unit 8, so that the audio transmission unit 8 wirelessly transmits the audio signal, after converting it into infrared light, to the audio reception unit 9 of the headphone 10.

Next, how to automatically adjust the angle of the panel unit 4 will be described with reference to FIG. 8.

The level reception unit 21 of the panel unit 4 outputs the level signal (for example, among four ranks of levels 0 to 3 shown in FIG. 8) received from the level transmission unit 20 of the headphone 10 to the control unit 15, and the control unit 15 drives the electric opening/closing mechanism 31 by way of the open/close control unit 32, to thereby adjust the angle of the panel unit 4 to the angle θ (optimum angle) at which the level signal becomes a highest state of level 3.

Specifically, the control unit 15 performs controlling to turn the panel unit 4 in its opening direction until the level of the level signal is lowered by one rank from level 3 to level 2. Subsequently, the control unit 15 calculates a center angle from an angle θ at the time the level has been raised by one rank from level 2 to level 3 and an angle θ at the time the level has been lowered by one rank from level 3 to level 2, to thereby drive the electric opening/closing mechanism 31 by way of the open/close control unit 32 so that the panel unit 4 is returned until it reaches the calculated center angle.

Accordingly, the front of the display 7 and the headphone (the position of the head of the viewer 50) can be always adjusted to an optimum angle, automatically. Further, even when the front seat 1 is reclined, the panel unit 4 is automatically adjusted to an optimum angle, so that a troublesome angle adjustment by hand becomes unnecessary.

Consequently, according to Embodiment 2, the panel device 100 is configured to comprise: the electric opening/closing mechanism 31 that electrically opens/closes the panel unit 4; the open/close control unit 32 that drives the electric opening/closing mechanism 31; and the control unit 15 that drives the electric opening/closing mechanism 31 by way of the open/close control unit 32, to thereby adjust an angle of the panel unit 4 to such an angle at which the reception level received by the level reception unit 21 becomes a predetermined level. Thus, it becomes possible to automatically turn the panel unit 4 to an optimum angle on the basis of the level signal transmitted from the headphone 10-side, so that the front of the display 7 and the headphone 10 (that is, the position of the head of the viewer 50) can be always adjusted to an optimum angle. As a result, stable audio signal can be received in the headphone 10-side.

Note that in Embodiments 1 and 2, a configuration is employed in which the panel unit 4 is turned from its stored state in the body unit 2-side with the display 7 being faced to that side, so as to unfold the display 7 so that the display 7 is faced behind the front seat 1; however, embodiments are not limited thereto, and, for example, such a configuration may be employed in which the panel unit 4 in a state where the display 7 is faced behind the front seat 1, is turnably coupled to the body unit 2. Even in this configuration, by adjusting the angle of the panel unit 4 so that the display 7 is directed in front of the eyes of the viewer 50, stable audio signal can be received in the headphone 10-side.

Further, in the above description, the audio transmission unit 8 is configured to wirelessly transmit the audio signal in a direction almost perpendicular to the display 7; however, the audio signal may be transmitted somewhat upward when the hinge mechanisms 3 on which the audio transmission unit 8 is placed (or, the audio transmission unit 8 placed at an arbitrary position on the panel unit 4) is positioned lower than the display 7, because it is desirable to take a positional relationship by which the audio signal from the audio transmission unit 8 can be transmitted in an optimum direction when the display 7 is placed in front of the viewer 50.

It should be noted that, other than described above, unlimited combination of the respective embodiments, modification of any configuration element in the embodiments and omission of any configuration element in the embodiments may be made in the present invention without departing from the scope of the invention.

INDUSTRIAL APPLICABILITY

As described above, the panel device according to the invention is configured so that the audio signal transmitted from the rear surface of the reclinable seat is stably received in the headphone side, and thus it is suited to be used as a panel device or the like that is placed on a seat in moving objects including a vehicle, a train, a ship, an airplane and the like.

DESCRIPTION OF REFERENCE NUMERALS AND SIGNS

1: front seat, 2: body unit, 2a: recess portion, 3: hinge mechanisms, 4: panel unit, 5: panel open switch, 6: latch, 7: display, 8: audio transmission unit, 9: audio reception unit, 10: headphone, 11, 11a to 11c: transmitter elements, 11', 11a' to 11c': directional angles, 12: special board, 13: lead wire, 14: panel-angle detection switch, 15: control unit, 16: circuit board, 17: amplifier, 18: speaker, 19: level determination unit, 20: level transmission unit (transmission unit), 21: level reception unit (reception unit), 22: level output unit (output unit), 23: antenna mark, 31: electric opening/closing mechanism, 32: open/close control unit, 50: viewer, 100: panel device, 200: video reproducing device.

The invention claimed is:

1. A panel device for wirelessly transmitting an audio signal from at a rear surface side of a reclinable seat toward a viewer behind the seat, comprising:
  a body unit placed on a rear surface of the seat;
  a hinge mechanism fixed to the body unit;
  a panel unit which is turnably coupled to the body unit through the hinge mechanism, so as to allow its display surface to be faced behind the seat;
  an audio transmission unit that is placed on a side of the panel unit where the display surface is placed, and transmits wirelessly the audio signal in a direction almost perpendicular to the display surface;
  a reception unit that receives a signal related to an audio signal wirelessly transmitted from a headphone, which includes an audio reception unit for receiving the audio signal wirelessly transmitted by the audio transmission unit and a transmission unit for wirelessly transmitting the signal related to the audio signal received by the audio reception unit; and
  an output unit that visualizes the signal related to the audio signal received by the reception unit,
  wherein the panel unit is turnable with visually recognizing the signal visualized by the output unit.

2. The panel device of claim 1, wherein the audio transmission unit is placed on the side of the panel unit where the display surface is placed, as well as on a pivotal axis line of the hinge mechanism.

3. The panel device of claim 1, wherein a circuit board of the audio transmission unit is unified with a circuit board of the panel unit.

4. The panel unit of claim 1, comprising:
  an electric opening/closing mechanism that electrically opens/closes the panel unit;

an open/close control unit that drives the electric opening/closing mechanism; and a control unit that drives the electric opening/closing mechanism by way of the open/close control unit, to thereby adjust an angle of the panel unit to such an angle at which the signal related to the audio signal received by said reception unit becomes a predetermined level.

5. A panel device for wirelessly transmitting an audio signal from at a rear surface side of a reclinable seat toward a viewer behind the seat, comprising:

a body unit placed on a rear surface of the seat;

a hinge mechanism fixed to the body unit;

a panel unit which is turnably coupled to the body unit through the hinge mechanism, so as to allow its display surface to be faced behind the seat; and an audio transmission unit that is placed on a side of the panel unit where the display surface is placed and transmits wirelessly the audio signal in a direction almost perpendicular to the display surface while the panel unit is open for the display surface to be viewed;

a reception unit that receives a level signal from a headphone, which includes an audio reception unit for receiving the audio signal wirelessly transmitted by the audio transmission unit and the transmission unit for wirelessly transmitting the level signal, the level signal representing a received level of the audio signal received by the audio reception unit; and an output unit that visualizes the level signal received by the reception unit.

* * * * *